United States Patent
Cheah et al.

(10) Patent No.: US 7,355,160 B2
(45) Date of Patent: Apr. 8, 2008

(54) COLOR ENHANCED OPTICAL MOUSE

(75) Inventors: Chiang Sun Cheah, Bagan Lallang (MY); Gim Eng Chew, Sungal Ara (MY); Li Chong Tai, Jalan Batu Uban (MY)

(73) Assignee: Avago Technologies General IP Pte Ltd, Singapore (SG)

( * ) Notice: Subject to any disclaimer, the term of this patent is extended or adjusted under 35 U.S.C. 154(b) by 36 days.

(21) Appl. No.: 11/369,288

(22) Filed: Mar. 6, 2006

(65) Prior Publication Data

US 2007/0215792 A1  Sep. 20, 2007

(51) Int. Cl.
*G06M 7/00* (2006.01)
*H01J 40/14* (2006.01)

(52) U.S. Cl. .................. 250/221; 345/166; 362/231

(58) Field of Classification Search ............. 250/221; 345/166; 362/231
See application file for complete search history.

(56) References Cited

U.S. PATENT DOCUMENTS

| | | | |
|---|---|---|---|
| 7,116,427 B2* | 10/2006 | Baney et al. ............... 356/498 |
| 7,221,356 B2* | 5/2007 | Oliver et al. ............... 345/166 |
| 2002/0070919 A1* | 6/2002 | Kajihara ..................... 345/166 |
| 2005/0219215 A1* | 10/2005 | Wu ............................ 345/166 |
| 2005/0231465 A1* | 10/2005 | DePue et al. ............... 345/156 |
| 2005/0231482 A1* | 10/2005 | Theytaz et al. ............. 345/166 |
| 2006/0132443 A1* | 6/2006 | Chien Wu .................. 345/166 |

* cited by examiner

*Primary Examiner*—Georgla Epps
*Assistant Examiner*—Seung C Sohn

(57) ABSTRACT

A pointing device and method for using the same to measure the motion of that pointing device over a surface is disclosed. The pointing device includes an illumination system, an imaging system, and a controller. The illumination system generates light in a plurality of wavelength bands and illuminates a surface below the pointing device with light from one of the wavelength bands. The imaging system records images of the illuminated surface. The controller selects the wavelength band used to illuminate the surface, compares first and second images recorded by the imaging system at different times when the surface is illuminated with that wavelength band, and determines a displacement indicative of the direction and distance the positioning device moved between the two different times.

20 Claims, 4 Drawing Sheets

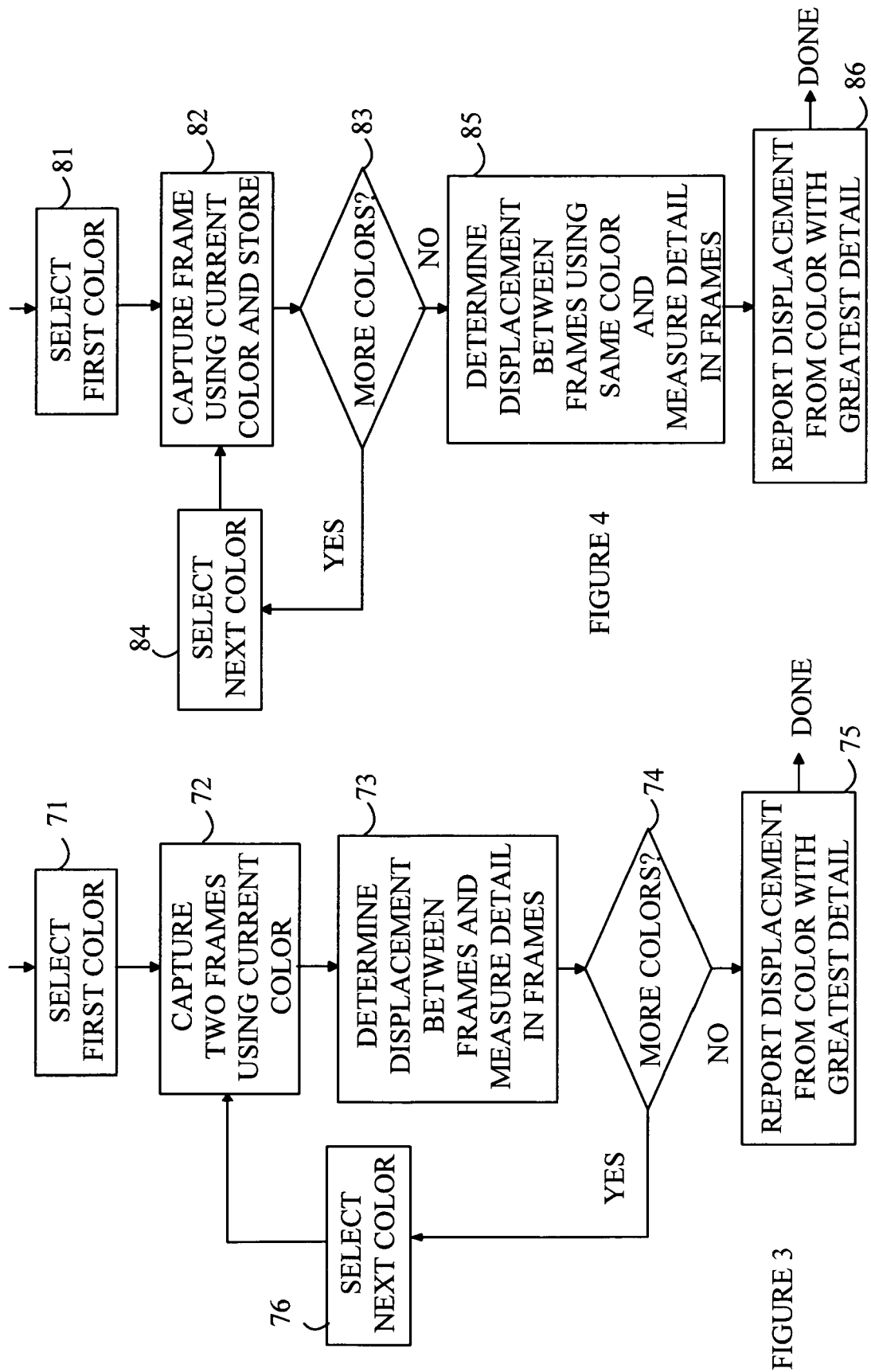

COLOR ENHANCED OPTICAL MOUSE

BACKGROUND OF THE INVENTION

A common form of pointing device for use with computers and the like is referred to as a "mouse". The computer user moves the device over a surface to move a cursor on the computer screen. The amount and direction of motion of the mouse are sensed by the mouse and determine the distance and direction in which the cursor moves on the screen. Inexpensive mice based on a ball that rolls over the surface have been used for some time. The ball turns two cylinders that sense the distance and direction of motion. Unfortunately, the ball picks up grease and other dirt from the surface and transfers this material to the cylinders. The resulting coating on the cylinders interferes with the motion of the cylinders, and hence, the devices must be cleaned periodically. The cleaning operation is awkward and time consuming. In addition, the numerous mechanical assemblies included in the device increase the cost of assembly.

Mice based on optical sensing avoid this problem. Originally, such mice had to be moved over a special pad that had grid lines that were sensed by the device. The need to use this special pad made these devices less attractive than the mechanical mice discussed above. More recently, optical mice that do not require such pads have been developed. These mice include a light source that illuminates the surface under the mouse at a shallow angle, which accentuates the structural details of the surface. An image sensor in the mouse records an image of the illuminated surface periodically. By comparing two successive images, the displacement of the mouse between the times at which the images were taken can be determined.

Cost and power consumption are particularly important factors in the design of an optical mouse. Optical mice are often powered by batteries, either directly or indirectly through a serial link to a laptop computer that is run on batteries. Hence, the power available to the mouse is often limited. Furthermore, the need to replace batteries in a mouse is viewed negatively by many consumers.

Optical mice typically utilize a red light source such as a red LED and a silicon image sensor. The silicon image sensor is inexpensive. Silicon image sensors have significantly greater light conversion efficiency in the red region of the spectrum. In addition, high efficiency red LEDs are relatively inexpensive. Hence, this combination provides an inexpensive mouse that requires relatively low power levels to operate provided the surface over which the mouse is moved reflects red light with high efficiency.

The signal generated by each pixel in the image sensor is proportional to the light received by that pixel times the conversion efficiency of the silicon pixel at the wavelength of the light generated by the light source. The efficiency of silicon for a red light is typically about a factor of two higher than the efficiency of silicon for a blue light.

Consider the case of a red surface that is illuminated by a red light source. Denote the signal generated by the silicon image sensor in this case by 1 unit. If a blue light source is used to illuminate a blue surface, the signal value would be only about 0.5 units, since the silicon pixels ability to convert the light to an electrical signal is only half that of the conversion efficiency for a red light. However, if a red light source is used to illuminate a blue surface, the signals from the pixels will be a small fraction of a unit, since most of the red light will be absorbed by the blue surface, and hence, not reach the image sensor. Hence, the performance of the mouse is also dependent on the color of the surface over which the mouse navigates, and this factor can be more important than the difference in conversion efficiency of the silicon sensor as a function of wavelength.

In principle, this problem can be reduced by increasing the intensity of the illumination source to increase the amount of light reaching the sensor when the navigation surface has an unfavorable color. However, this would increase the power expended by the mouse. In battery powered devices, the increased power requirements can present a significant problem. In addition, the life of the LED would be reduced by the increased power.

SUMMARY OF THE INVENTION

The present invention includes a pointing device and method for using the same to measure the motion of that pointing device over a surface. The pointing device includes an illumination system, an imaging system, and a controller. The illumination system generates light in a plurality of wavelength bands and illuminates a surface below the pointing device with light from one of the wavelength bands. The imaging system records images of the illuminated surface. The controller selects the wavelength band used to illuminate the surface, compares first and second images recorded by the imaging system at different times when the surface is illuminated with that wavelength band, and determines a displacement indicative of the direction and distance the positioning device moved between the two different times. In one aspect of the invention, the controller selects the one of the plurality of wavelength bands by examining a level of detail in the recorded images using different ones of the plurality of wavelength bands.

BRIEF DESCRIPTION OF THE DRAWINGS

FIG. 3 is a flow chart of an algorithm for providing motion reports based on the color that provides the best detail according to one embodiment of the present invention.

FIG. 4 is a flow chart for another embodiment of the present invention.

DETAILED DESCRIPTION OF THE PREFERRED EMBODIMENTS OF THE INVENTION

Figure 1:
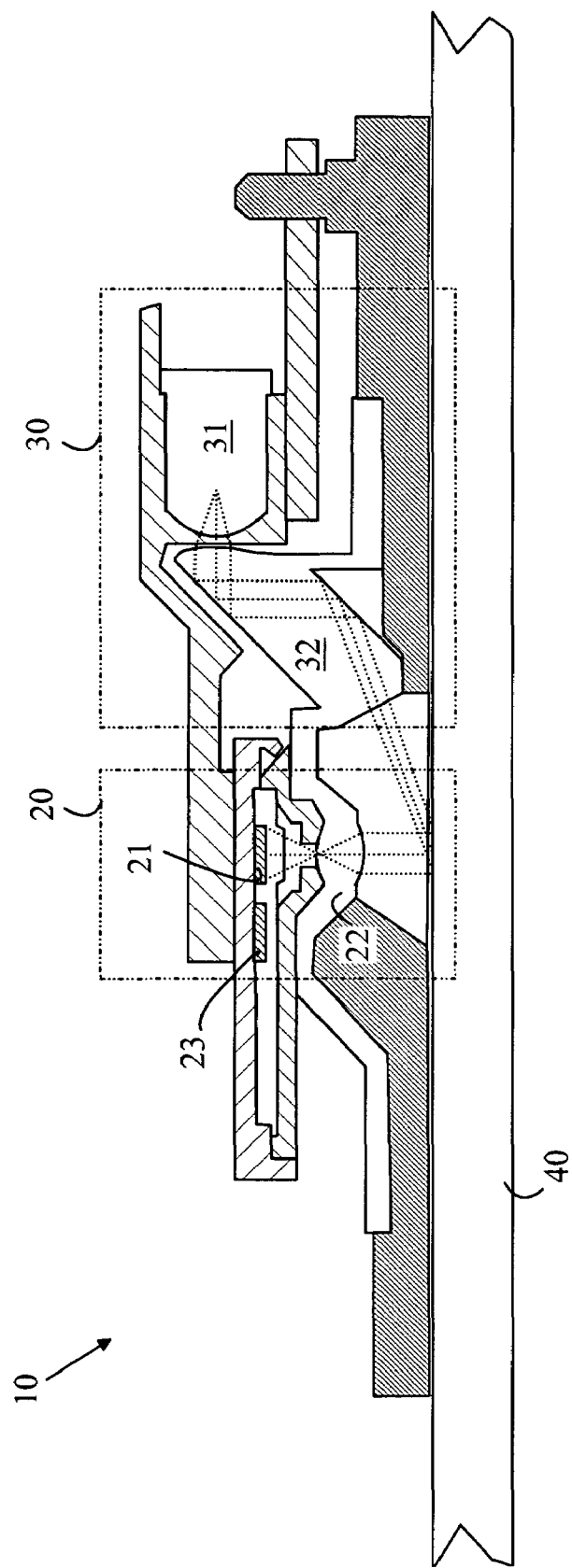
FIG. 1 is a simplified cross-sectional view of a prior art optical mouse that moves over an opaque substrate.

The manner in which the present invention provides its advantages can be more easily understood with reference to FIG. 1, which is a simplified cross-sectional view of a prior art optical mouse 10 that moves over an opaque substrate 40. Mouse 10 may be viewed as having two principal components, an illumination section 30 and an imaging section 20. Illumination section 30 typically includes a light source 31 and an optical assembly 32 that illuminates surface 40 with collimated light that strikes the surface at a shallow angle relative to the surface. The light source is typically an LED. Light from the illuminated portion of the surface is imaged by the imaging section onto a sensor 21 with the aid of a lens assembly 22. Sensor 21 is a two-dimensional array of imaging elements that forms an image of a portion of surface 40.

When the mouse is moved relative to the surface, the image shifts on sensor 21. If images are taken sufficiently close together in time, each successive image will contain a portion of the previous image. Hence, by comparing two successive images, mouse 10 can determine the offset between the images. For example, mouse 10 can compute the correlation of the first image shifted by various amounts with the second image. The shift that provides the highest correlation is assumed to be the displacement of the mouse during the period of time that elapsed between the times at which the two images were taken. In the embodiment shown in FIG. 1, it is assumed that a controller 23 performs the displacement computations and outputs a signal indicative of the motion. However, embodiments in which the image is output to a computer attached to the optical mouse can also be constructed.

Figure 2:
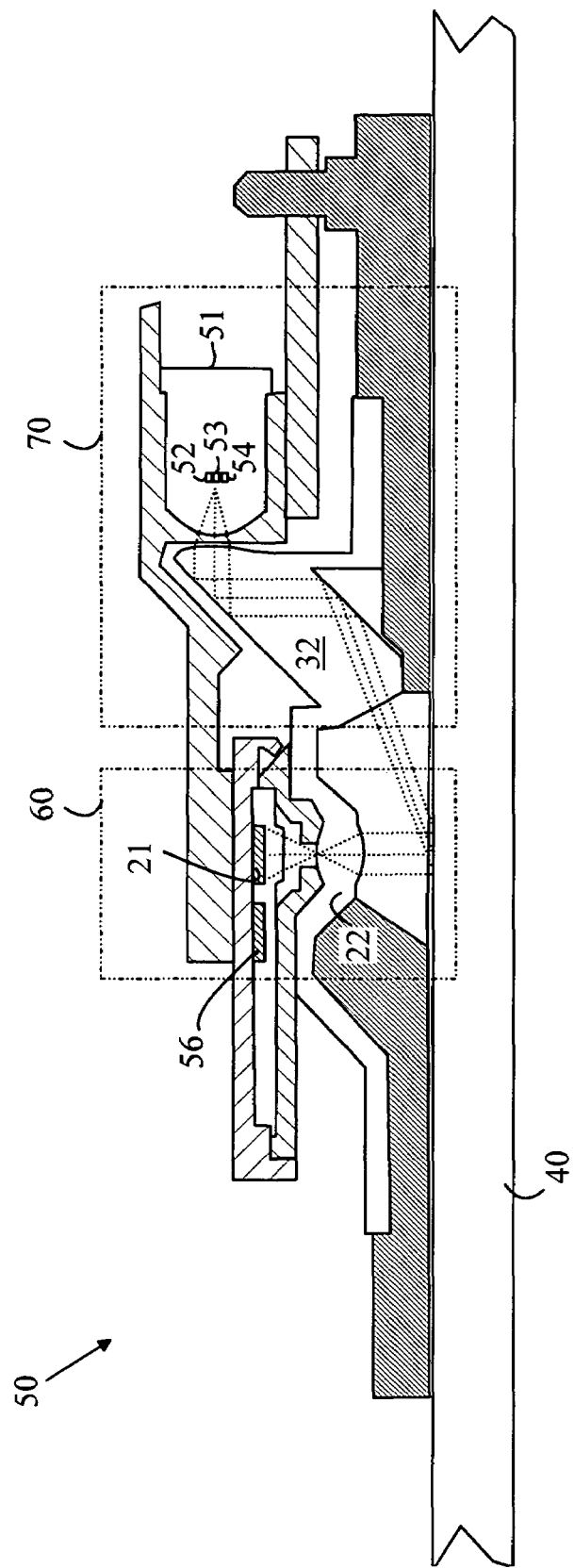
FIG. 2 is a cross-sectional view of an optical mouse that uses a light source having multiple colors to emit light at different colors.

As noted above, prior art mice typically utilize a light source that consists of a single red LED. The present invention, in contrast, uses a light source having a plurality of LEDs that emit light at different colors: By utilizing the color that provides the best performance on the particular surface over which the mouse is moved, the performance and/or power consumption of the mouse can be improved. Refer now to FIG. 2, which is a cross-sectional view of a pointing device 50 according to one embodiment of the present invention. Pointing device 50 includes an imaging section 60 and an illumination section 70. The illumination section utilizes a light source 51 that includes three LEDs 52-54. For the purposes of this discussion, it will be assumed that LEDs 52-54 emit light in the red, blue, and green regions of the spectrum, respectively. A controller 56 selects the particular LED that is utilized at any given time utilizing one of the algorithms discussed below. By selecting the LED that provides the best surface detail at the desired power level, the power required by the pointing device is reduced.

Some form of quality measure is needed by controller 56 to provide a basis for deciding which color should be utilized. In one embodiment, the color that provides the highest level of detail is used to determine the motion of the pointing device. In one embodiment of the present invention, the level of detail in the images formed by the imaging array is determined by extracting features from the image. Simple algorithms for extracting features from an image are known to the art, and hence, will not be discussed in detail here. In one embodiment, controller 56 counts the number of features in the image. The color having the highest number of features is utilized.

However, it should be noted that other measures of the detail in the conventional image could be utilized. For example, algorithms based on the spatial frequencies in the observed images can also be utilized. Images that have a higher content of high spatial frequencies are also more detailed on average than images having a lower content of such frequencies.

In general, the motion of the pointing device is determined by measuring the correlation of two frames illuminated with the same color, after one of the frames is shifted spatially. The shift that produces the highest correlation is reported to provide a measure of the motion of the pointing device between the frames. A number of algorithms can be used to choose the correct color. Refer now to FIG. 3, which is a flow chart of an algorithm according to one embodiment of the present invention for providing motion reports based on the color that provides the best detail. In this embodiment, controller 56 selects a first color as shown at 71 to be the current color. The LED associated with that color is turned on and two frames are captured as shown at 72. The displacement of the pointing device between the frames is then determined by finding the shift in the second frame that maximizes the correlation between the first frame and the shifted second frame. The level of detail in the two frames is also measured and stored as shown at 73. The controller then proceeds to the next color as shown at 74 and 76. When all of the colors have been used, controller 56 reports the displacement that was stored for the color that had the highest level of detail as shown at 75.

Refer now to FIG. 4, which is a flow chart for another embodiment of the present invention. In this embodiment, controller 56 cycles through the colors recording a frame at each color and storing that frame as shown at 81-84. When two frames have been recorded for each color, controller 56 determines the displacements between each of the two frames taken with the same color and measures the level of detail in the recorded frames as shown at 85. Controller 56 then reports the displacement determined that was stored for the color that provided the greatest detail as shown in 86.

The above-described embodiments assure that each motion report corresponds to the color yielding the highest level of detail. However, these algorithms are less efficient from a power dissipation point of view, since the data from two of the colors is not used. In addition, the maximum frame rate for any given power level is reduced by a factor of three. The performance of the pointing device will deteriorate significantly if the frame rate falls below some minimum value. Accordingly, embodiments that are more efficient may be desirable under some circumstances.

Figure 5:
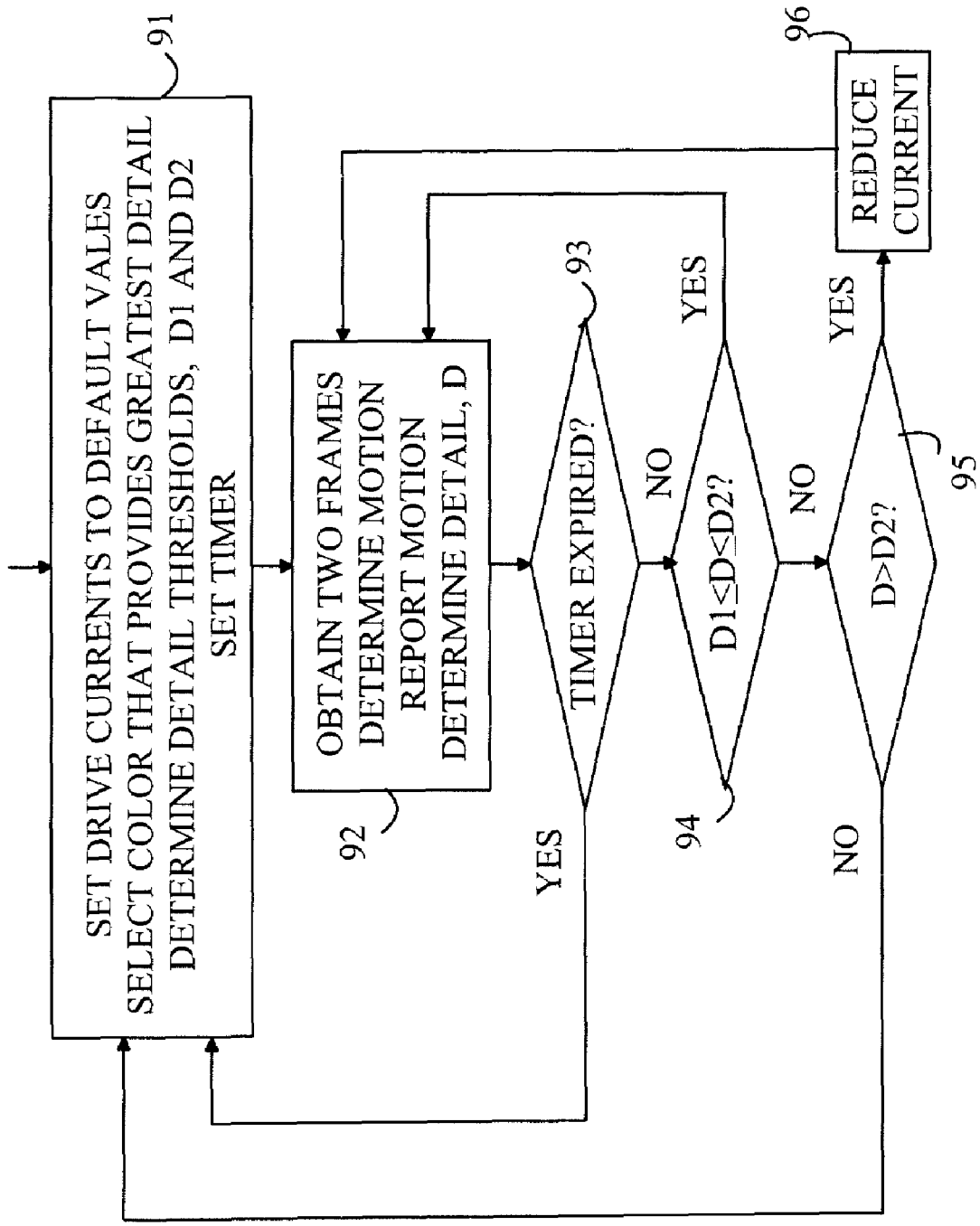
FIG. 5 is a flow chart of another embodiment of a control algorithm that could be executed by the controller.

Refer now to FIG. 5, which is a flow chart of another embodiment of a control algorithm that could be executed by controller 56. In this embodiment, controller 56 controls both the color and drive current of the illumination source. In this embodiment controller 56 switches back and forth between two modes. In the first mode, controller 56 executes an algorithm to determine which color provides the highest level of detail as shown at 91. Either of the color sequences discussed above could be utilized for this mode. This mode is initiated whenever the pointing device is powered on. The drive current of the illumination source is set to a default value during this operation. Once the desired color is determined, controller 56 determines the minimum level of detail, D1, that must be present in the frames to continue with acquiring frames at the selected color and a second threshold level, D2, which is greater than D1.

The second threshold level is used to adjust the brightness of the illumination source during the second mode. If the level of detail is high, the drive current can be reduced without substantially reducing the performance of the pointing device. Decreasing the current through the corresponding LED in the illumination source reduces the power consumption, in addition to increasing the lifetime of the LED.

In addition, controller 56 sets a timer that provides the maximum time that one color will be utilized before examining the other possible colors again. It should be noted that the timer feature can effectively be disabled by setting a sufficiently long period of time if desired.

Controller 56 then switches to a mode in which only the selected color is utilized. In this mode, controller 56 obtains two successive frames with the selected color and compares each pair to determine the motion between the two frames and the detail in the frames as shown at 92. Controller 56 then reports the measured motion to the device connected to the pointing device. Controller 56 then determines whether or not the timer has expired as shown at 93. If the timer has expired, controller 56 returns to the first mode.

If the timer has not expired, controller 56 determines if the level of detail is sufficient to reduce the power to the illumination source. If the level of detail in the last frame is between D1 and D2, as shown at 94, the current cannot be reduced. In this case, controller 56 obtains another frame and repeats the motion tracking process. If the level of detail is greater than D2, then controller 56 reduces the current through the illumination source by some predetermined amount before returning to motion tracking as shown at 95 and 96. If D is less than D1, controller 56 returns to the first mode.

While the above-described embodiments of the present invention have utilized three LEDs that emit light in the red, blue, and green regions of the spectrum, respectively, other illumination arrangements can be utilized. Any light source that allows the surface over which the pointing device moves to be illuminated with a plurality of different colors can be utilized. In addition, one of the light sources could be in the ultraviolet region of the spectrum to provide an image based on fluorescence in that surface. In addition, laser diodes or other light generating devices can be utilized in place of the LEDs.

Various modifications to the present invention will become apparent to those skilled in the art from the foregoing description and accompanying drawings. Accordingly, the present invention is to be limited solely by the scope of the following claims.

What is claimed is:

1. A pointing device comprising:
   an illumination system that generates light in a plurality of wavelength bands and illuminates a surface below said pointing device with light from one of said wavelength bands;
   an imaging system that records images of said illuminated surface; and
   a controller that selects said one of said wavelength bands used to illuminate said surface, that compares first and second images recorded by said imaging system at different times when said surface is illuminated with that wavelength band, and that determines a displacement indicative of a direction and distance said positioning device moves between said two different times;
   wherein said controller operates in a first mode in which said controller determines one of said wavelength bands to be used in recording images and a second mode in which said controller determines said displacement utilizing said determined one of said wavelength bands for a plurality of successive displacement determinations;
   wherein said controller sets a level of illumination in said first mode to a first value and wherein said controller alters said level of illumination if a level of detail of one of said recorded images is greater than a predetermined level of detail in said second mode.

2. The pointing device of claim 1 wherein said illumination system comprises a plurality of LEDs, each LED generating light in a different one of said wavelength bands.

3. The pointing device of claim 1 wherein said illumination system comprises a plurality of laser diodes, each laser diode generating light in a different one of said wavelength bands.

4. The pointing device of claim 1 wherein said controller selects said one of said plurality of wavelength bands by examining a level of detail in said recorded images using different ones of said plurality of wavelength bands.

5. The pointing device of claim 4 wherein said level of detail is determined by counting objects in said recorded images.

6. The pointing device of claim 4 wherein said level of detail is determined by measuring spatial frequencies in said recorded images.

7. The pointing device of claim 1 wherein said controller switches from said second mode to said first mode after a predetermined time has elapsed.

8. The pointing device of claim 1 wherein said controller switches from said second mode to said first mode if a level of detail in said recorded images is less than a predetermined level of detail.

9. A method for determining the motion of a pointing device over a surface, said method comprising:
   selecting one of a plurality of wavelength bands;
   illuminating a surface below said pointing device with that wavelength band;
   recording images of said surface when illuminated with light from said selected wavelength band;
   comparing first and second images recorded by said imaging system at different times when said surface is illuminated with that wavelength band, and determining a displacement indicative of the direction and distance said positioning device moved between said two different times;
   operating in a first mode in which said one of said wavelength bands to be used in recording images is selected and a second mode in which said displacements are determined utilizing said selected one of said wavelength bands for a plurality of successive displacement determinations;
   setting a level of illumination in said first mode; and
   reducing said level of illumination in said second mode if a level of detail in one of said recorded images is greater than a predetermined level of detail.

10. The method of claim 9 wherein said selected wavelength band is determined by examining a level of detail in said recorded images using different ones of said plurality of wavelength bands.

11. The method of claim 10 wherein said level of detail is determined by counting objects in said recorded images.

12. The method of claim 10 wherein said level of detail is determined by measuring spatial frequencies in said recorded images.

13. The method of claim 9 wherein said second mode is switched to said first mode after a predetermined time has elapsed.

14. The method of claim 9 wherein said second mode is switched to said first mode if a level of detail in said recorded images is less than a predetermined level of detail.

15. A pointing device comprising:
   an illumination system comprising a plurality of light sources to generate light in a plurality of wavelength bands to illuminate a surface with the light in each of the wavelength bands;
   an imaging system to record two images of the illuminated surface for each of the wavelength bands; and
   a controller to determine and store displacements of the pointing device for each of the wavelength bands based on the two recorded images for each of the wavelength bands, wherein the controller is further configured to measure and store a level of detail of the two recorded images for each of the wavelength bands and to report one of the displacements for one of the wavelength bands having a highest level of detail.

16. The pointing device of claim 15 wherein the imaging system is further configured to record the two images for one of the wavelength bands and the controller is further configured to determine and store the displacement of the one of the wavelength bands before the imaging system proceeds to record the two images for another of the wavelength bands.

17. The pointing device of claim 15 wherein the imaging system is further configured to record and store one of the two images for each of the wavelength bands and then to record and store another of the two images for each of the wavelength bands and then to determine and store the displacements for each of the wavelength bands.

18. The pointing device of claim 15 wherein the controller is further configured to find a shift in the two recorded images for each of the wavelength bands to determine the displacements for each of the wavelength bands, wherein the shift of each of the wavelength bands maximizes a correlation between the two recorded images for each of the wavelength bands.

19. The pointing device of claim 15 wherein the controller is further configured to operate in a first mode and a second mode, wherein the controller is configured in the first mode to determine one of the wavelength bands to be used to record the two images of the illuminated surface for the determined wavelength band, wherein the controller is configured in the second mode to determine the displacement of the pointing device for the determined wavelength band.

20. The pointing device of claim 19 wherein the controller is further configured in the first mode to set a level of illumination to a first value, and the controller is further configured in the second mode to alter the level of illumination if the level of detail of one of the recorded images is greater than a predetermined level of detail.

* * * * *